United States Patent [19]
Linzer et al.

[11] Patent Number: 5,668,598
[45] Date of Patent: Sep. 16, 1997

[54] MOTION VIDEO COMPRESSION SYSTEM WITH GUARANTEED BIT PRODUCTION LIMITS

[75] Inventors: Elliot Neil Linzer, Bronx; Heidi Aarlien Peterson, New York, both of N.Y.; Eric Viscito, San Francisco, Calif.

[73] Assignee: International Business Machines Corporation, Armonk, N.Y.

[21] Appl. No.: 410,786

[22] Filed: Mar. 27, 1995

[51] Int. Cl.⁶ .................................................. H04N 7/28
[52] U.S. Cl. .................. 348/402; 348/390; 348/384; 341/65; 341/67; 375/240
[58] Field of Search ............................ 348/402, 390, 348/384; 375/240; 341/65, 67

[56] References Cited

U.S. PATENT DOCUMENTS

| | | | |
|---|---|---|---|
| 5,162,795 | 11/1992 | Shirota | 341/67 |
| 5,231,484 | 7/1993 | Gonzales et al. | 348/405 |
| 5,325,125 | 6/1994 | Naimpally et al. | 348/402 |
| 5,392,038 | 2/1995 | Bhandari et al. | 341/67 |
| 5,510,839 | 4/1996 | Hamano et al. | 348/402 |

*Primary Examiner*—Howard W. Britton
*Assistant Examiner*—Frank Snow
*Attorney, Agent, or Firm*—Richard M. Ludwin; Anne Vachon Dougherty

[57] ABSTRACT

A system and methods for implementing a video encoder which for each picture guarantees that the number of bits produced will not exceed a limit. In a preferred embodiment, the system includes two cooperating components or subsystems that together with other components of a video encoder operate to encode the input video, detect when the limit on the number of bits produced so far is close to exceeding the limit on the number of bits that may be produced and reduce the bit rate when such a condition is detected. One aspect of the current invention embodies a macroblock (MB) bit stream generator that can operate in a "low bit rate mode" Another aspect embodies a subsystem for detecting when the number of bits in the picture is close to exceeding the limit.

15 Claims, 7 Drawing Sheets

MOTION VIDEO COMPRESSION SYSTEM WITH GUARANTEED BIT PRODUCTION LIMITS

I. BACKGROUND OF THE INVENTION a. Field of the Invention

The present invention relates to the field of data compression and, more particularly, to a system and techniques for compressing digital motion video signals.

b. Related Art

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiber-optic networks as well as broadcast terrestrially and over direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG-1 algorithm, has been developed by the Moving Picture Experts Group (MPEG), part of a joint technical committee of the International Standards Organization (ISO) and the International Electrotechnical Commission (IEC). The MPEG-1 standard describes a compressed representation of video and associated audio signals. The standard specifies the syntax of the compressed bit stream and the method of decoding, but leaves considerable latitude for novelty and variety in the algorithm employed in the encoder.

The MPEG-1 algorithm is intended to be used primarily with fixed bit-rate storage media. However, the number of bits in each picture will not be exactly constant, due to the different types of picture processing, as well as the inherent variation with time of the spatio-temporal complexity of the scene being coded. The MPEG-1 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows.

Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

In order that the bit stream satisfy the MPEG-1 rate control requirements, it is necessary that all the data for each picture is available within the buffer at the instant it is needed by the decoder. This requirement translates to upper and lower bounds ($U^{VBV}$ and $L^{VBV}$) on the number of bits allowed in each picture. The upper and lower bounds for a given picture depend on the number of bits used in all the pictures preceding it. It is the function of the encoder to produce bit streams which satisfy this requirement. It is not expected that actual decoders will be configured or operate in the manner described above. The hypothetical decoder and its associated buffer are simply a means of placing computable limits on the size of compressed pictures.

There are a number of schemes which address certain aspects of bit rate control. For example, W-H CHEN and W. K. PRATT, in their paper, "Scene Adaptive Coder," IEEE Trans. Communications, vol. COM-32, pp. 225–232, March 1984, discuss the idea of a rate-controlled quantization factor for transform coefficients. The rate control strategy used there is commonly applied in image and video compression algorithms to match the variable bit-rate produced when coding to a constant bit-rate channel.

Another rate control scheme can be found in U.S. Pat. No. 5,231,484 to Gonzales and Viscito, which describes a rate control mechanism that can be used for MPEG-1. The rate control mechanism keeps track, after each macroblock, of how many bits have been produced in the picture so far. When the number of bits that have been produced in the picture so far begins to approach $U^{VBV}$, QP is increased.

It is noted that in both of the above cited rate control schemes, the rate control is achieved by varying the quantization levels used for each macroblock. However, even if QP is set to the maximum legal value it is possible that more than $U^{VBV}$ will be produced. This may occur, for example, if the video buffer is very small and/or a very high complexity scene is being encoded.

II. SUMMARY OF THE INVENTION

In light of the above, it is an object of the present invention to provide a system and techniques for encoding pictures in such a way that the encoder will never produce more bits in a picture than a fixed upper limit.

The present invention involves a system and method for implementing a video encoder which for each picture guarantees that the number of bits produced will not exceed a limit. We denote by $U_i$ the limit for picture i. In a preferred embodiment, the system includes a detector which detects when the limit on the number of bits produced so far is close to exceeding the limit on the number of bits that may be produced and a bit stream generator which reduces the bit rate when such a condition is detected.

IV. DETAILED DESCRIPTION OF THE PREFERRED EMBODIMENTS a. The MPEG-1 Environment

As the present invention may be applied in connection with an MPEG-1 encoder, in order to facilitate an understanding of the invention, some pertinent aspects of the MPEG-1 video compression algorithm will be reviewed. It should be understood, however, that the invention can also be applied to other video coding algorithms which share some of the features of the MPEG-1 algorithm.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements.

A successful lossy compression algorithm eliminates redundant and irrelevant information, allowing relatively large errors where they are not likely to be visually significant and carefully representing aspects of a sequence to which the human observer is very sensitive. The techniques employed in the MPEG-1 algorithm for Step 1 can be described as predictive/interpolative motion-compensated hybrid DCT/DPCM coding. Huffman coding, also known as variable length coding, is used in Step 2. Although, as mentioned, the MPEG-1 standard is really a specification of the decoder and the compressed bit stream syntax, the following description of the MPEG-1 specification is, for ease of presentation, primarily from an encoder point of view.

The MPEG-1 video standard specifies a coded representation of video for digital storage media. The algorithm is designed to operate on noninterlaced component video. Each picture has three components: luminance (Y), red color difference ($C_r$), and blue color difference ($C_b$). The $C_r$ and $C_b$ components each have half as many samples as the Y component in both horizontal and vertical directions.

An MPEG-1 data stream consists of a video stream and an audio stream which are packed, together with systems information and possibly other bitstreams, into a systems data stream that can be regarded as layered. Within the video layer of the MPEG-1 data stream, the compressed data is further layered. A description of the organization of the layers will aid in understanding the invention.

Figure 1:
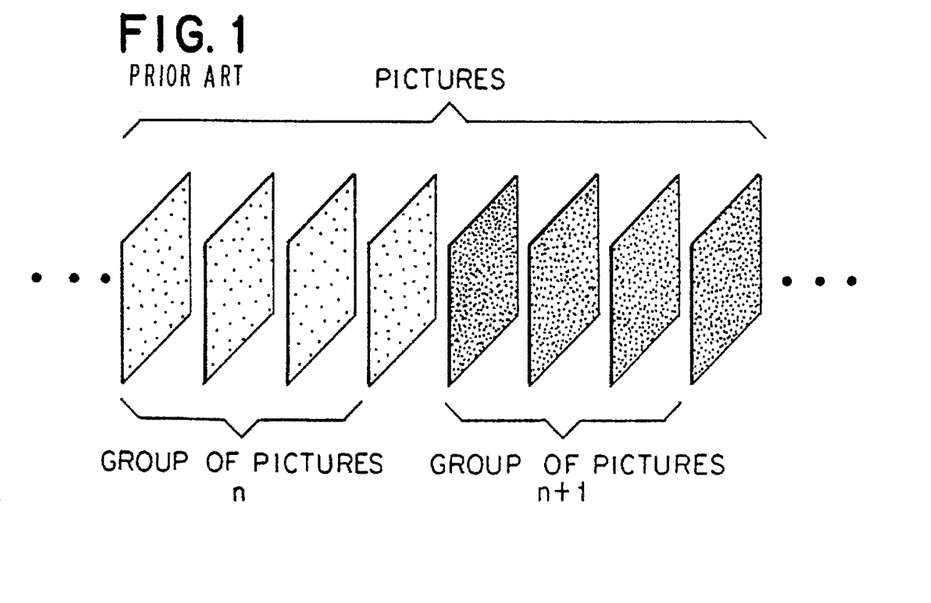
FIG. 1 depicts an exemplary set of Groups of Pictures (GOP's) layer of compressed data within the video compression layer of the MPEG-1 data stream.

The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a Group of Pictures (GOP). A general illustration of this layer is shown in FIG. 1. Decoding may begin at the start of any GOP, essentially independent of the preceding GOP's. There is no limit to the number of pictures which may be in a GOP, nor do there have to be equal numbers of pictures in all GOP's.

Figure 2:
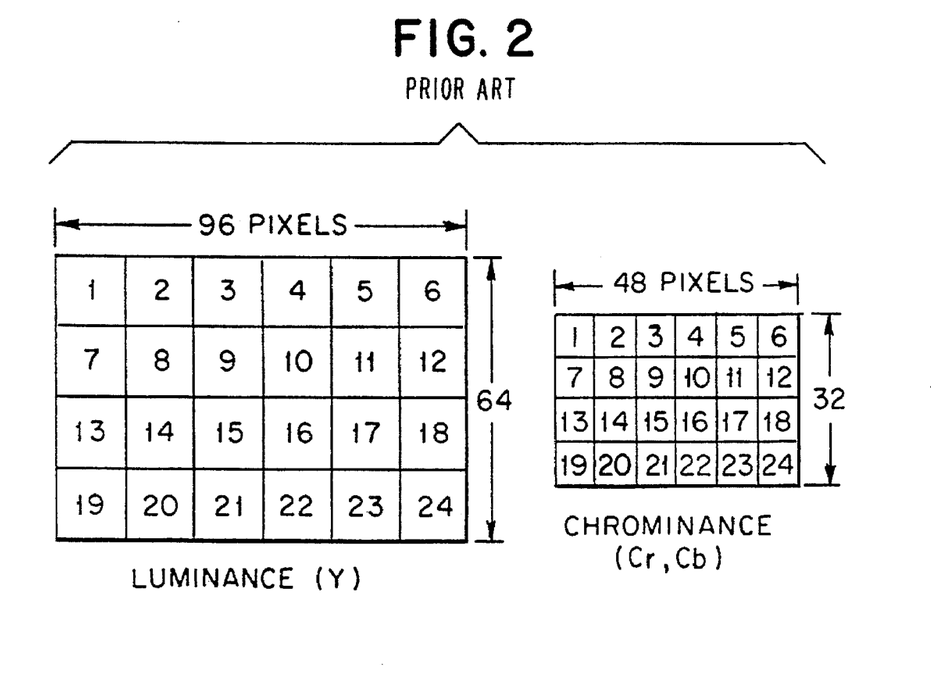
FIG. 2 depicts an exemplary Macroblock (MB) subdivision of a picture in the MB layer of compressed data within the video compression layer of the MPEG-1 data stream.

The third or Picture layer is a single picture. A general illustration of this layer is shown in FIG. 2. The luminance component of each picture is subdivided into 16×16 regions; the color difference components are subdivided into 8×8 regions spatially co-sited with the 16×16 luminance regions. Taken together, these co-sited luminance region and color difference regions make up the fifth layer, known as a macroblock (MB). Macroblocks in a picture are numbered consecutively in lexicographic order, starting with Macroblock 1.

Figure 3:
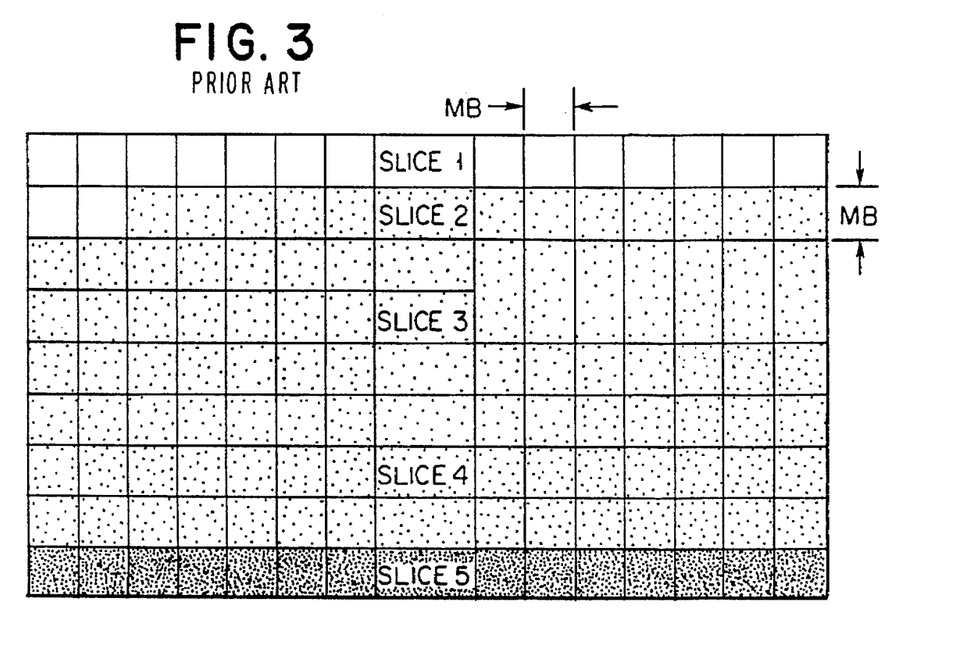
FIG. 3 depicts an exemplary Slice subdivision of a frame or picture.

Between the Picture and MB layers is the fourth or slice layer. Each slice consists of some number of consecutive MB's. Slices need not be uniform in size within a picture or from picture to picture. They may be only a few macroblocks in size or extend across multiple rows of MB's as shown in FIG. 3.

Figure 4:
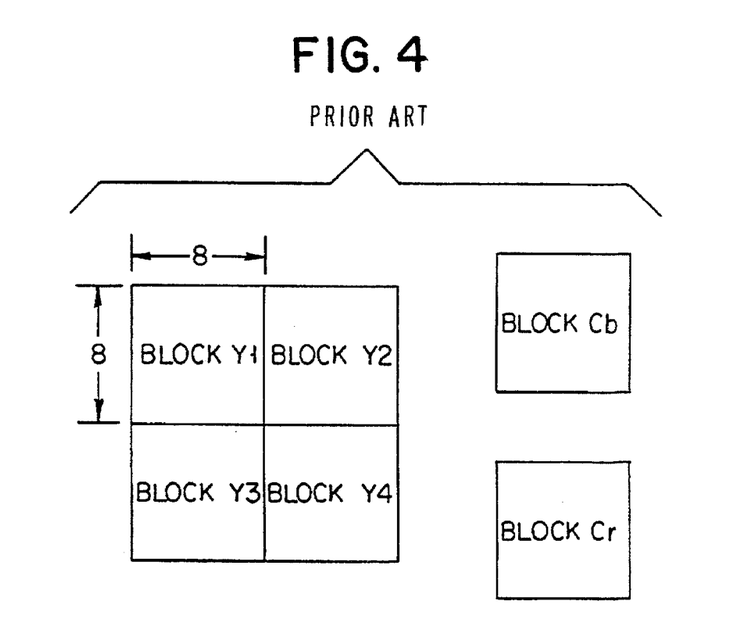
FIG. 4 depicts the Block subdivision of a Macroblock.

Finally, each MB consists of four 8×8 luminance blocks and two 8×8 chrominance blocks as seen in FIG. 4. If the width of each luminance picture (in picture elements or pixels) is denoted as C and the height as R (C is for columns, R is for rows), a picture is $C_{MB}$=C/16 MB's wide and $R_{MB}$ R/16 MB's high. There are $N_{MB}$=C×(R/256) macroblocks in a picture.

The Sequence, GOP, Picture, and slice layers all have headers associated with them. The headers begin with byte-aligned Start Codes and contain information pertinent to the data contained in the corresponding layer. It is noted that a compressed bit stream consists of bits used for encoding headers and bits used for encoding macroblocks. We refer to bits used for encoding headers as header bits.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Each GOP must start with an I-picture and additional I-pictures can appear within the GOP. The other two types of pictures, predictively motion-compensated pictures (P-pictures) and bidirectionally motion-compensated pictures (B-pictures), will be described in the discussion on motion compensation below.

Figure 5:
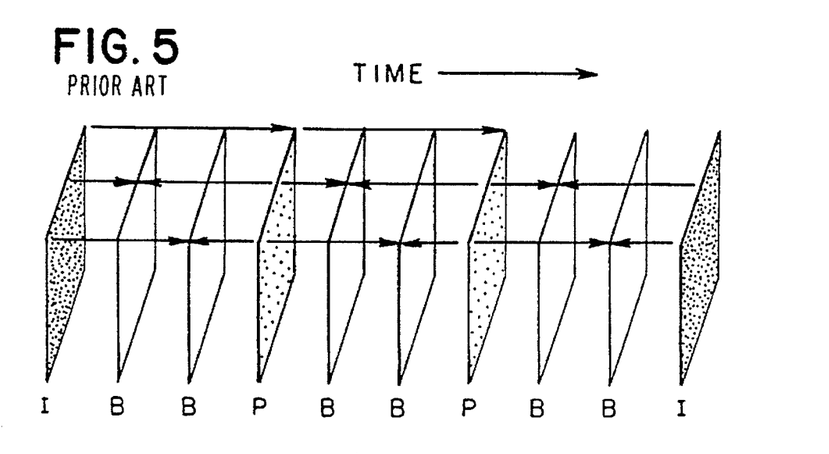
FIG. 5 illustrates the two level motion compensation among pictures in a GOP employed in MPEG-1.

Certain rules apply as to the number and order of I-, P-, and B-pictures in a GOP. Referring to I- and P-pictures collectively as anchor pictures, a GOP must contain at least one anchor picture, and may contain more. In addition, between each adjacent pair of anchor pictures, there may be zero or more B-pictures. An illustration of a typical GOP is shown in FIG. 5.

One very useful image compression technique is transform coding. In MPEG-1 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-1, the DCT operation converts a block of n×n pixels into an n×n set of transform coefficients. Like several of the international compression standards, the MPEG-1 algorithm uses a DCT block size of 8×8. The DCT transformation by itself is a lossless operation, which can be inverted to within the precision of the computing device and the algorithm with which it is performed.

The second step, quantization of the DCT coefficients, is the primary source of lossiness in the MPEG-1 algorithm. Denoting the elements of the kth two-dimensional array of DCT coefficients for each MB by $c_{kmn}$, where m and n range from 0 to 7 and k ranges from 0 to 5, aside from truncation or rounding corrections, quantization is achieved by dividing each DCT coefficient $c_{kmn}$ by $w_{kmn}$ times QP, with $w_{kmn}$ being a weighting factor and QP being the quantizer parameter. The weighting factor $w_{kmn}$ allows coarser quantization to be applied to the less visually significant coefficients. The quantized DCT coefficients are referred to as $d_{kmn}$. The coefficient $d_{k00}$ is the quantized DC coefficient.

The quantizer parameter QP is the primary means of trading off quality vs. bit-rate in MPEG-1. It is important to note that QP can vary from MB to MB within a picture. This feature, permits different regions of each picture to be quantized with different step-sizes, and can be used to attempt to equalize (and optimize) the visual quality over each picture and from picture to picture. Varying QP can also adjust the bit rate of a stream produced by an encoder; QP is increased or decreased to respectively decrease or increase the number of bits produced.

Let $q_{kmn}$ be equal to $d_{kmn}$ if either m or n is not equal 0, and let $q_{k00}$ be the difference between the DC coefficient for each block and the previously coded block of the same component. The coefficients $q_{kmn}$ are organized and coded using a set of Huffman codes. As the details of the Huffman encoding step are not essential to an understanding of the invention and are generally understood in the art, no further description will be offered here.

Most motion picture video sequences exhibit a high degree of correlation between consecutive pictures. A useful method to remove this redundancy prior to coding a picture is "motion compensation". Motion compensation requires some means for modeling and estimating the motion in a scene. In MPEG-1, each picture is partitioned into macroblocks and each MB is compared to 16×16 regions in the same general spatial location in a predicting picture or pictures. The region in the predicting picture(s) that best matches the MB in some sense is used as the prediction. The difference between the spatial location of the MB and that of it's predictor is referred to as a motion vector. Thus, the outputs of the motion estimation and compensation for an MB are motion vectors and a motion-compensated difference macroblock. In compressed form, these generally require fewer bits than the original MB itself. Pictures which are predictively motion-compensated using a single predicting picture in the past are known as P-pictures. This kind of prediction is also referred to in MPEG-1 as forward-in-time prediction.

As discussed previously, the time interval between a P-picture and its predicting picture can be greater than one picture interval. For pictures that fall between P-pictures or between an I-picture and a P-picture, backward-in-time prediction may be used in addition to forward-in-time prediction (see FIG. 5). Such pictures are known as bidirectionally motion-compensated pictures, B-pictures. For B-pictures, in addition to forward and backward prediction, interpolative motion compensation is allowed in which the predictor is an average of a block from the previous predicting picture and a block from the future predicting picture. In this case, two motion vectors are needed.

The use of bidirectional motion compensation leads to a two-level motion compensation structure, as depicted in FIG. 5. Each arrow indicates the prediction of the picture touching the arrowhead using the picture touching the dot. Each P-picture is motion-compensated using the previous anchor picture (I-picture or P-picture, as the case may be). Each B-picture is motion-compensated by the anchor pictures immediately before and after it. No limit is specified in MPEG-1 on the distance between anchor pictures, nor on the distance between I-pictures. In fact, these parameters do not have to be constant over an entire sequence. Referring to the distance between I-pictures as N and to the distance between P-pictures as M, the sequence shown in FIG. 5 has (N,M) =(9,3).

It should therefore be understood that an MPEG-1 sequence consists of a series of I-pictures which may have none or one or more P-pictures sandwiched between them. The various I- and P-pictures may have no B-pictures or one or more B-pictures sandwiched between them, in which latter event they operate as anchor pictures.

It will be appreciated that there are three kinds of motion compensation which may be applied to MB's in B-pictures: forward, backward, and interpolative. The encoder selects one of these modes. For some MBs, none of the motion compensation modes yields an accurate prediction. In such cases, the MB may be processed in the same fashion as a macroblock in an I-picture, (i.e., as an intramode MB). This is another possible motion compensation mode. Thus, there are a variety of motion compensation modes for P- and B-pictures.

Aside from the need to code side information relating to the motion compensation mode used to code each MB and any motion vectors associated with that mode, the coding of motion-compensated macroblocks is very similar to that of intramode MBs. Although there is a small difference in the quantization, the model of division by $w_{kmn}$ times QP still holds. In motion compensated MBs, differential coding is not used for the DC coefficients; the quantized DCT coefficients themselves are $q_{kmn}$, which are coded with Huffman codes.

Besides using Huffman codes to represent the quantized DCT data, Huffman codes are also used to represent the motion vectors. The motion vectors themselves are encoded differentially; that is, Huffman codes are assigned not for the motion vectors themselves but for the difference between the motion vector(s) in the MB and reference motion vectors which can be calculated from what has been encoded prior to the current macroblock. We refer to the differential motion vectors as $mv_n$, where n is zero for a forward or predicted MB and n ranges from zero to one for a interpolative MB. The encoder may or may not explicitly send a value for QP in each MB. If the encoder does not explicitly send a value for QP in the bit stream, then the value used in the last MB is used. The motion compensation mode used in a macroblock together with whether or not QP is explicitly sent comprise the macroblock mode.

The information needed to generate a compressed representation of a macroblock is the macroblock type, the differential motion vectors, QP, and $q_{kmn}$.

It should be appreciated that the decisions made by the encoder, together with the data in the original macroblock determine how many bits will be used in the encoded representation of the macroblock. The Huffman codewords that represent the quantized DCT coefficients use more bits when, in gross terms, the quantized coefficients are larger. Thus we need more bits for the coefficients when QP is small and/or if the coefficients are large. Also, more bits are needed to encode large differential motion vectors than to encode small differential motion vectors. Finally, using a value for QP that differs from the value of QP used in the previous macroblock requires extra bits to represent QP.

It should be understood, from the foregoing, that the purpose of the MPEG-1 standard is to specify the syntax of the compressed bit stream and the methods used to decode it. Considerable latitude is afforded encoder algorithm and hardware designers to tailor their systems to the specific needs of their application. In particular, the decoder may decide how many bits to use in various parts of a picture.

Figure 6:
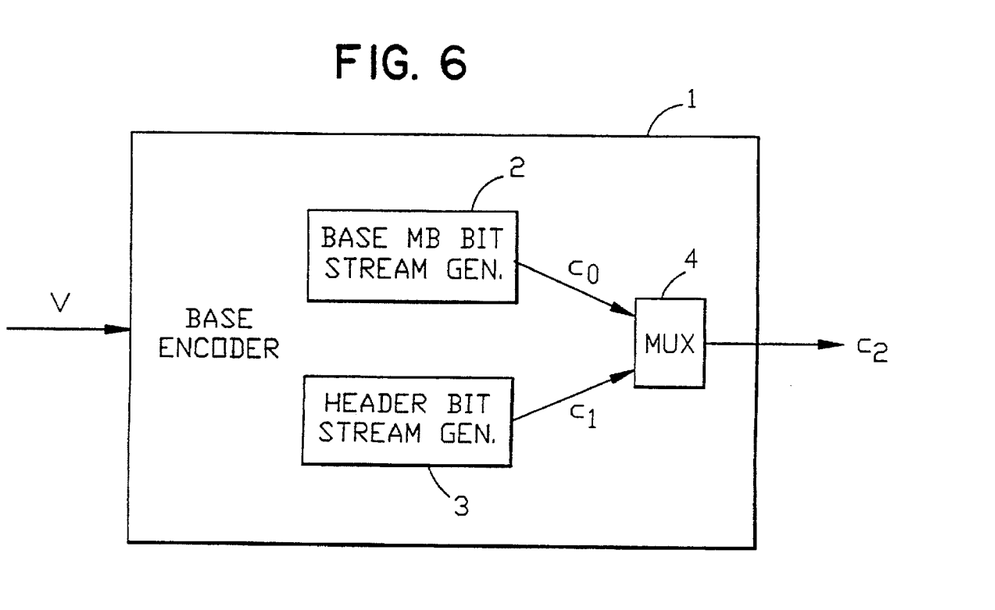
FIG. 6 is a block diagram of a simplified view of a conventional encoder.

A simplified view of a conventional MPEG-1 encoder is shown in FIG. 6. The encoder 1 includes many subsystems, three of which are shown. In particular, we show a base MB bit stream generator 2, a header bit stream generator 3 and a multiplexer 4. The input video signal, V, is fed to the encoder. The MB bit stream generator creates compressed representations for each MB, which form a bit stream $c_0$. The header bit stream generator generates sequence, GOP, picture and slice headers, which form a bit stream $c_1$. The multiplexer 4 puts the header bits and the macroblock bits in the output compressed bit stream $c_2$.

Figure 7:
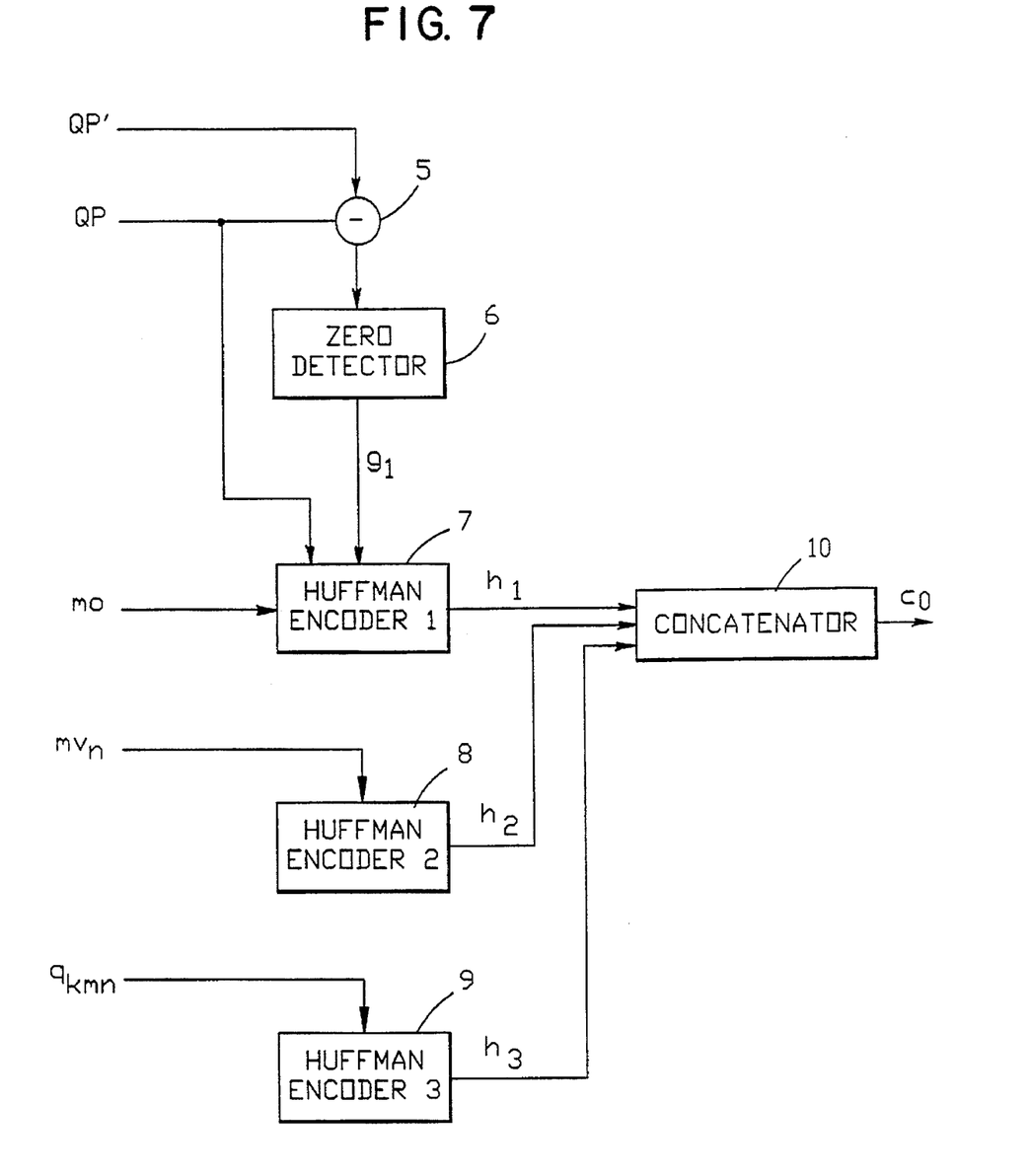
FIG. 7 is a block diagram of a base MB bit stream generator, which is a component of the encoder shown in FIG. 6.

A conventional base MB bit stream generator is shown in more detail in FIG. 7. Several signals are sent to this bit stream generator: QP' (the value of QP used for the last MB), QP for the current MB, mo (the motion compensation mode for the macroblock), the differential motion vector(s), $mv_n$ and the coefficients $q_{kmn}$, QP' and QP are fed to a subtracter 5. The result of the subtraction is sent to a zero detector 6, which generates a signal $g_1$ which is equal to zero if QP'=QP and is equal to 1 otherwise.

The signals $g_1$ and mo (which together for the macroblock mode) as well as QP are sent to a first Huffman encoder subsystem 7, which generates a set of Huffman codewords, $h_1$. The motion vector(s) $mv_n$ are sent to a second Huffman encoder subsystem 8, which generates a set of Huffman codewords $h_2$. The DCT coefficients $q_{kmn}$ are sent to a third Huffman encoder subsystem 9, which generates a set of Huffman codewords $h_3$. The sets of Huffman codewords $h_1$, $h_2$ and $h_3$ are concatenated in a concatenator 10, and the result is $c_0$, a compressed version of the macroblock.

b. Preferred Embodiment of an Encoder

Figure 8:
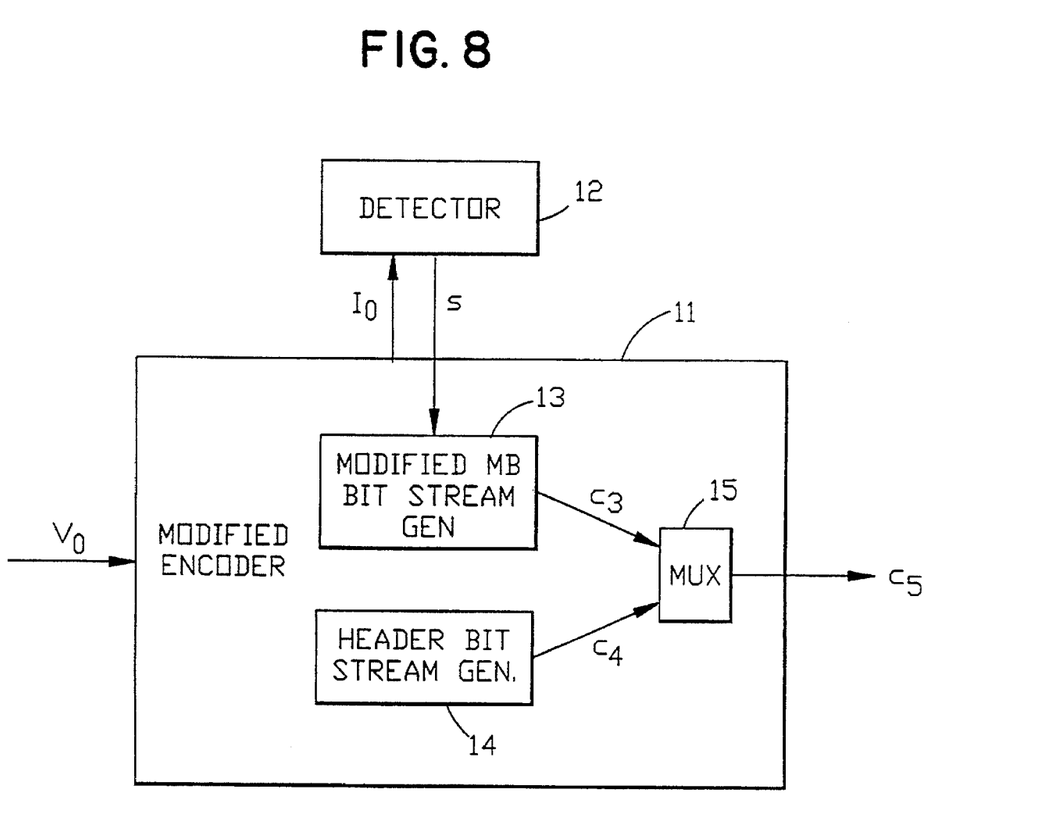
FIG. 8 is a preferred embodiment of a video encoder which for each picture guarantees that the number of bits produced will not exceed a limit that incorporates two component subsystems for implementing techniques in accordance with the principles of present invention.

FIG. 8 shows all of the components of an embodiment of the current invention and their interconnection. The input video signal, $V_0$, is fed to the modified encoder, subsystem 11. Before each macroblock is encoded, the encoder sends an information signal, $I_0$, to the detector subsystem 12. For each macroblock, the detector subsystem sends out a switching signal, s, which can either be a one or a zero. The switching signal is sent to the modified MB bit stream generator 13.

The modified MB bit stream generator creates compressed representations for each MB, which form a bit stream $c_3$. The header bit stream generator 14, generates sequence, GOP, picture and slice headers, which form a bit stream $c_4$. The multiplexer 15 puts the header bits and the MB bits in the output compressed bit stream, $c_5$.

Figure 9:
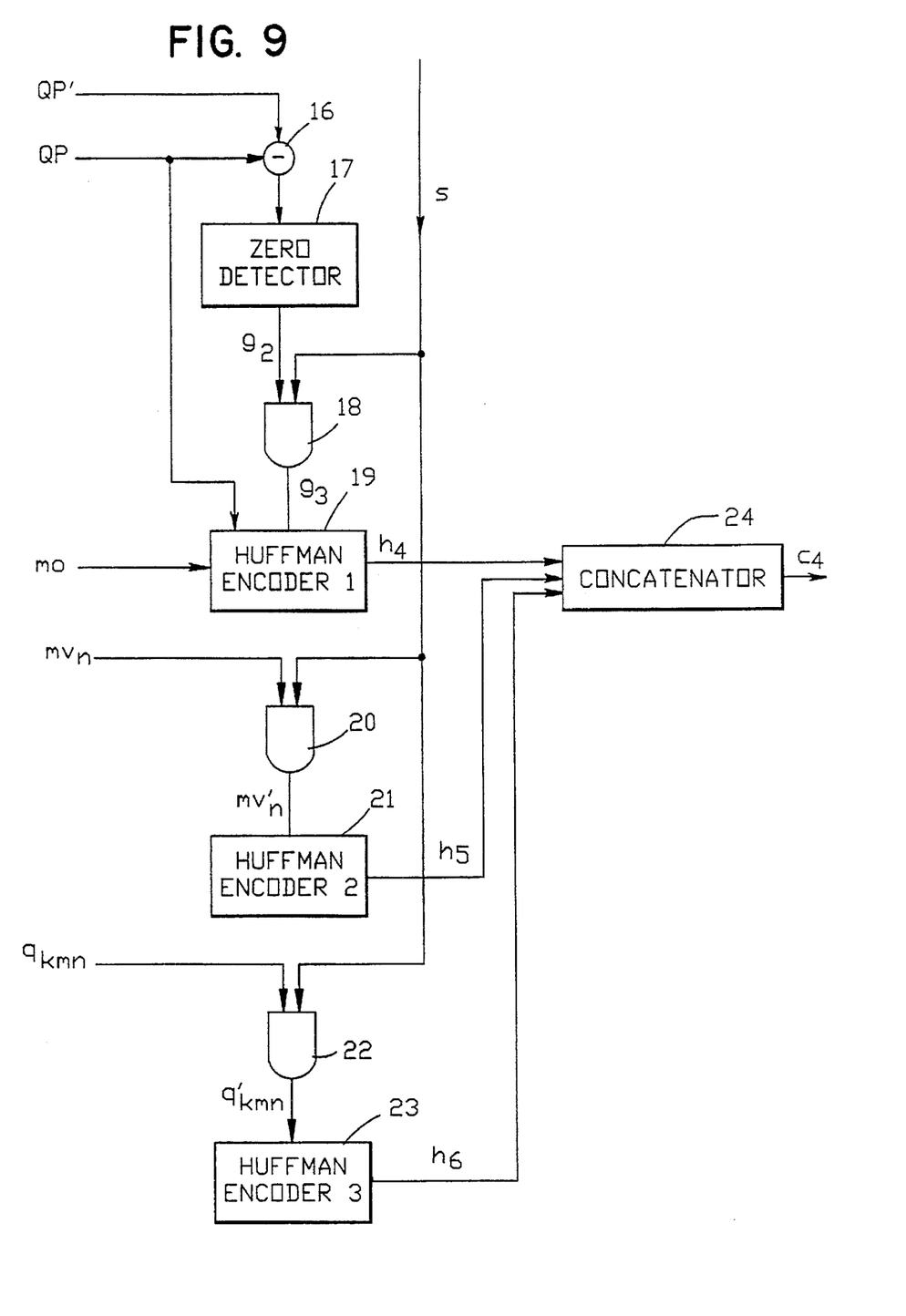
FIG. 9 shows the preferred embodiment for a modified bit stream generator, which is a subsystem of the encoder shown in FIG. 8.

FIG. 9 shows the modified MB bit stream generator. In addition to the signals QP', QP, mo, $mv_n$, and $q_{kmn}$, which are sent to the base MB bit stream generator, the modified MB bit stream generator also receives the switching signal, s.

The function of the modified MB bit stream generator can be described in gross as follows. If the switching signal s that is an input to the modified MB bit stream generator is equal to 1, then the modified bit stream generator operates in exactly the same manner as the bit stream generator shown in FIG. 6. On the other hand, if s is equal to 0, then the modified bit stream generator produces a compressed macroblock that uses very few bits. This compressed macroblock is generated by encoding in the current macroblock, the same value for QP that was used in the last macroblock (which means that bits that otherwise might have been used to represent the new value for QP will be saved), replacing the differential motion vectors with 0's (which will reduce the number of bits used to represent the differential motion vectors) and replacing the quantized DCT coefficients with 0's (which will make Huffman codewords used for the DCT coefficients use very few bits).

Turning again to FIG. 9, QP' and QP are fed to a subtracter 16. The result of the subtraction is sent to a zero detector 17 which generates a signal $g_2$ which is equal to zero if QP'=QP and is equal to 1 otherwise.

The signals $g_2$ and the switching signal, s, are sent to an AND circuit 18, whose output, $g_3$, is equal to $g_2$ if s=1 and zero if s=0. The signals $g_3$, QP and mo are all sent to a first Huffman encoder subsystem 19, which generates a set of Huffman codewords, $h_4$. The operation of the Huffman encoder subsystem 19 is the same as the operation of the first Huffman encoder in FIG. 7, except that this Huffman encoder is fed by the signal $g_3$ rather then $g_1$.

The signals for the differential motion vectors, $mv_n$, and the switching signal, s, are sent to an AND circuit 20 whose output, $mv'_n$, is equal to $mv_n$ for all n if s=1 and zero for all n, if s=0. The signal $mv_n$ is sent to a second Huffman encoder subsystem 21, which generates a set of Huffman codewords, h5. The operation of this subsystem is the same as the operation of the second Huffman encoder in FIG. 7, except that this Huffman encoder is fed by the signal $mv'_n$ rather then $mv_n$.

The signals for the DCT coefficients, $q_{kmn}$ and the switching signal, s, are sent to an AND circuit 22, whose output, $q'_{kmn}$ is equal to $q_{kmn}$ for all k, m and n if s=1 and zero for all k, m and n if s=0. The signal $q_{kmn}$ is sent to a third Huffman encoder subsystem 23, which generates a set of Huffman codewords, $h_6$. The operation of this subsystem is the same as the operation of the third Huffman encoder in FIG. 7, except that this Huffman encoder is fed by the signal $q'_{kmn}$ rather then $q_{kmn}$.

The sets of Huffman codewords $h_4$, $h_5$ and $h_6$ are concatenated in a concatenator, subsystem 24, and the result is $c_4$, a compressed version of the macroblock. This subsystem operates in the same manner as concatenator subsystem 10 of FIG. 7, except that the inputs are $h_4$, $h_5$ and $h_6$ rather then $h_1$, $h_2$, and $h_3$.

Figure 10:
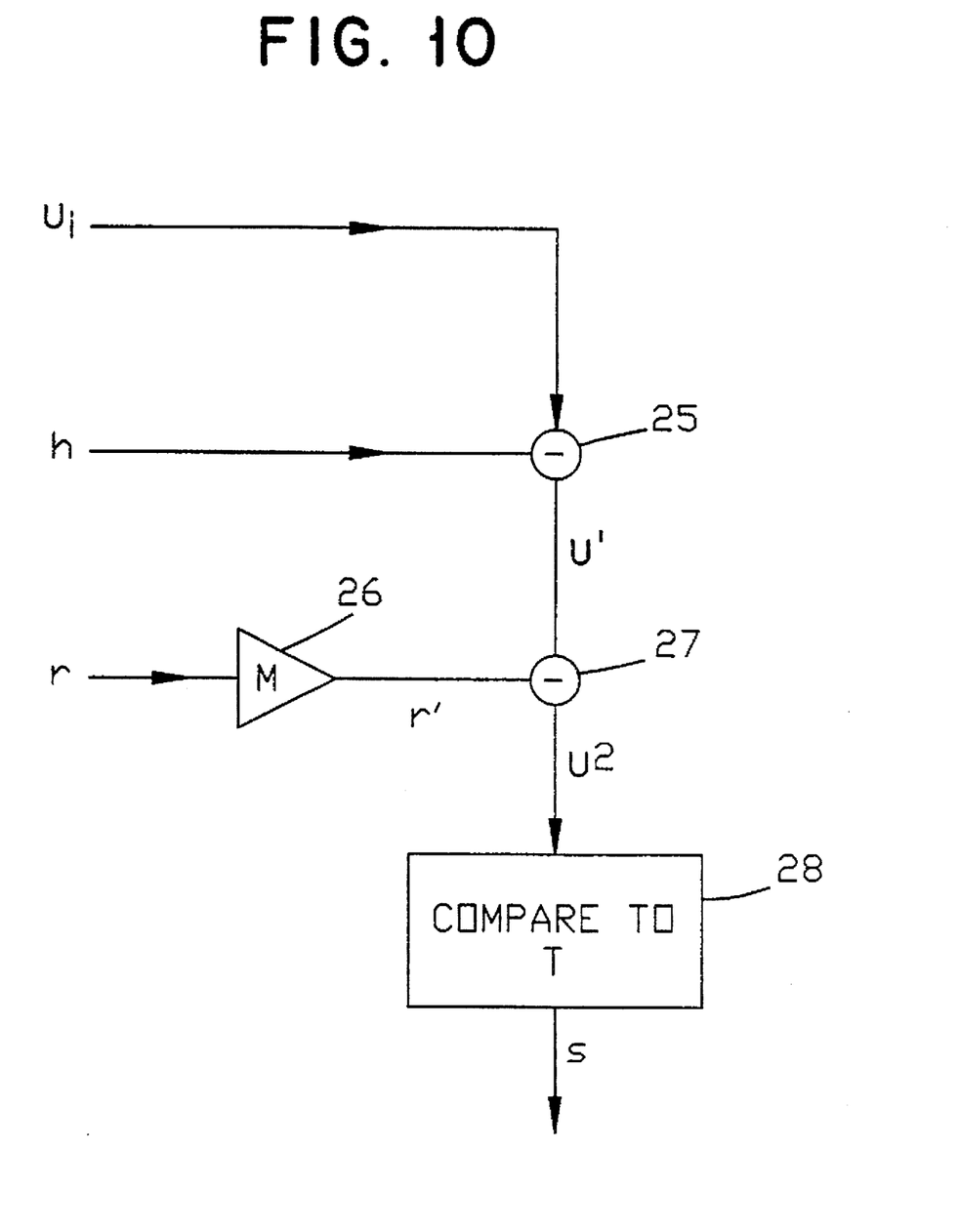
FIG. 10 shows the preferred embodiment for the detector which is a subsystem of the encoder shown in FIG. 8.

FIG. 10 shows the preferred embodiment for the detector which is a subsystem of the encoder shown in FIG. 8. This detector has three input signals and one output signal. The input signals are: $U_i$ (an upper limit for the number of bits to be produced in the current picture); h (a number that is greater then or equal to the number of header bits that have not yet been put in the picture) and r (the number of MBs that have not yet been encoded in the picture). The output signal, s, is the switching signal that is sent to the modified bit stream generator.

The signals $U_i$ and h are fed into a difference (subtractor) circuit, 25, which produces an output signal $U'=U_i-h$. The signal r is fed into a multiplier, 26, which produces an output signal $r'=r\times m$ (where m is a constant). The signals U' and r' are fed into a difference (subtractor) circuit 27, which produces an output signal $U^2=U'-r'$. The signal $U^2$ is fed into a comparator 28, which produces the output s which is equal 1 to if $U^2>T$ (where T is a threshold) and is equal to 0 otherwise.

Under the following conditions, the number of bits produced in picture i will be less then $U_i$:

m is greater then or equal to the maximum number of bits produced in a macroblock when s=0;

T is greater then or equal to the maximum number of bits produced in a macroblock when s=1;

$U_i$ is greater than the sum of the header bits (H) needed for the entire picture and the product of m and $N_{MB}$; $U_i>H+(m\times N_{MB})$.

The present embodiments can be modified in a number of ways. For example, the modified MB bitstream generator can be constructed such that only a subset of $q_{kmn}$ are set to zero when s=0. As another example, the modified MB bitstream generator can be constructed such that the differential motion vectors are not zeroed out when s=0. As a third example, the modified MB bitstream generator can be constructed to always choose the motion compensation mode which will use the fewest number of bits.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A motion video compression system, comprising:

means, responsive to a switching signal, for generating a bit stream comprising a first number of bits encoding a portion of a picture, the first number of bits being bounded by a first limit;

means, responsive to the switching signal, for generating a bit stream comprising a second number of bits encoding the portion of the picture, the second number of bits being bounded by a second limit, the second limit being smaller than the first limit; and a switching signal generator for setting a state of the switching signal as a function of a number of bits predicted to be required to encode said portion of the picture.

2. The system of claim 1 wherein the first limit and the second limit are not dependent upon input picture data.

3. A motion video compression system, comprising:

a comparator for comparing the sum of a first number of bits already used to encode a portion of a picture plus a second number of bits predicted to be needed to encode the remainder of the picture to a maximum number of bits allowed to encode the picture and for generating an output based upon said comparing;

an encoder, responsive to said output from said comparator, said encoder being adapted to encode the remainder of said picture in a first mode using a number of bits determined in accordance with a first encoding method, when the sum does not exceed the maximum number of bits and to encode the remainder of said picture using a second number of bits in accordance with a second encoding method when the sum exceeds the maximum number of bits.

4. The system of claim 4 wherein the encoder comprises a plurality of Huffman encoders and wherein, in response to an output of the comparator, the bit encoding for at least one of the values including the motion compensation vector, the quantization value and the quantized transform coefficients for the remainder of the picture is minimized.

5. The system of claim 3 wherein the encoder comprises a plurality of Huffman encoders and wherein, in response to said output of the comparator, the motion compensation mode for the remainder of the picture is modified.

6. A method for compressing a video motion picture, comprising the steps of:

generating a switching signal having a state determined by the number of bits predicted to be required to encode the remainder of the picture to be encoded responsive to the switching signal being in a first state, generating a bit stream comprising a first number of bits encoding a segment of said remainder, the first number of bits being bounded by a first limit; and responsive to the switching signal being in a second state, generating a bit stream comprising a second number of bits encoding a segment of said remainder, the second number of bits being bounded by a second limit, the second limit being smaller than the first limit.

7. The method of claim 6 wherein the first limit and the second limit are not dependent upon input picture data.

8. The method of claim 6 wherein said generating of a bit stream comprising a second number of bits encoding a segment of said remainder in part comprises minimizing the bit encoding for at least two of the values including the motion compensation vector, the quantization value and the quantized transform coefficients for said segment.

9. The system of claim 6 wherein the encoder comprises a plurality of Huffman encoders and wherein, in response to an output of the comparator, the motion compensation mode for the remainder of the picture is modified.

10. A method for encoding a video motion picture, comprising the steps of:

comparing a sum of a first number of bits used to encode a first portion of a picture plus a second number of bits predicted to be needed to encode the remainder of the picture to a maximum number of bits allowed to encode the picture in its entirety and generating a signal based upon said comparing;

encoding the remainder of the picture in a first mode using a number of bits determined in accordance with a first encoding method, when the sum does not exceed the maximum number of bits; and encoding the remainder of the picture using a second number of bits in accordance with a second encoding method when the sum exceeds the maximum number of bits.

11. The system of claim 10 wherein the encoding comprises Huffman encoding and wherein in response to an output of the comparator, the bit encoding for at least one of the values including the motion compensation vector, the quantization value and the quantized transform coefficients for the remainder of the picture is minimized.

12. The system of claim 10 wherein the encoding comprises Huffman encoding and wherein in response to an output of the comparator, the motion compensation mode for the remainder of the picture is modified.

13. A method for encoding a video motion picture, comprising the steps of:

encoding a first portion of said video motion picture;

determining a value based upon the number of bits predicted to be required to encode the remaining portion of said video motion picture;

comparing said value to a fixed threshold;

generating a switching signal based upon said comparing;

encoding the remaining portion of said video motion picture using a first encoding method in response to said switching signal when the value exceeds said threshold; and encoding the remaining portion of said video motion picture using a second encoding method in response to said switching signal when the value exceeds said threshold.

14. The method of claim 13 wherein the encoding comprises Huffman encoding and wherein in response to said switching signal, the bit encoding for at least one of the values including the motion compensation vector, the quantization value and the quantized transform coefficients for the remaining portion of said video motion picture is minimized.

15. The system of claim 13 wherein the encoding comprises Huffman encoding and wherein in response to said switching signal, the motion compensation mode for the remaining portion of said vide motion picture is modified.

* * * * *